July 13, 1954     E. W. LANGENBERG     2,683,474
METHOD OF AND APPARATUS FOR FORMING POLYGONAL BRACKETS
Filed Feb. 25, 1950     6 Sheets-Sheet 1

INVENTOR.
Earl W. Langenberg,
BY Dawson, Ooms, Booth and Spangenberg,
ATTORNEYS.

July 13, 1954   E. W. LANGENBERG   2,683,474
METHOD OF AND APPARATUS FOR FORMING POLYGONAL BRACKETS
Filed Feb. 25, 1950   6 Sheets-Sheet 2
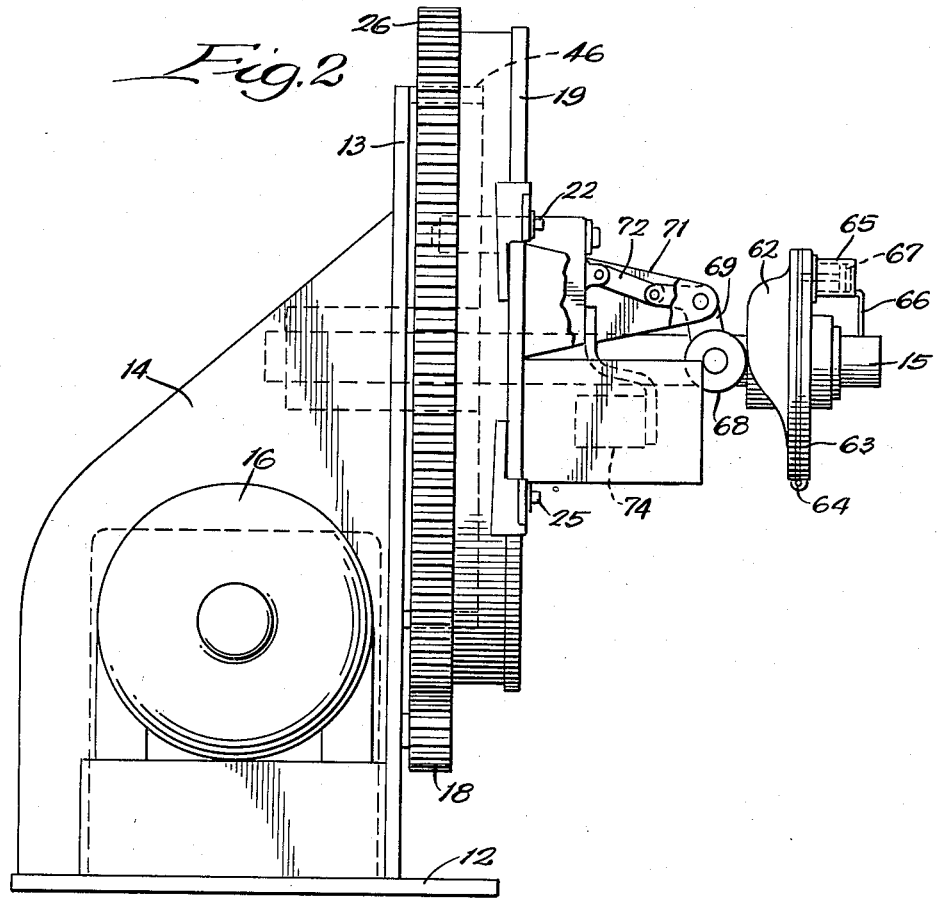
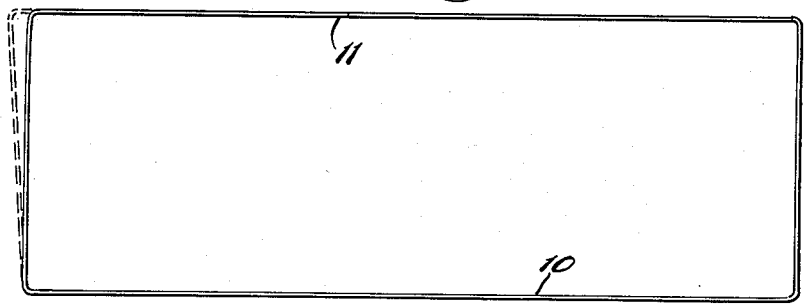
INVENTOR:
Earl W. Langenberg,
BY Dawson, Ooms, Booth and Langenberg,
ATTORNEYS.

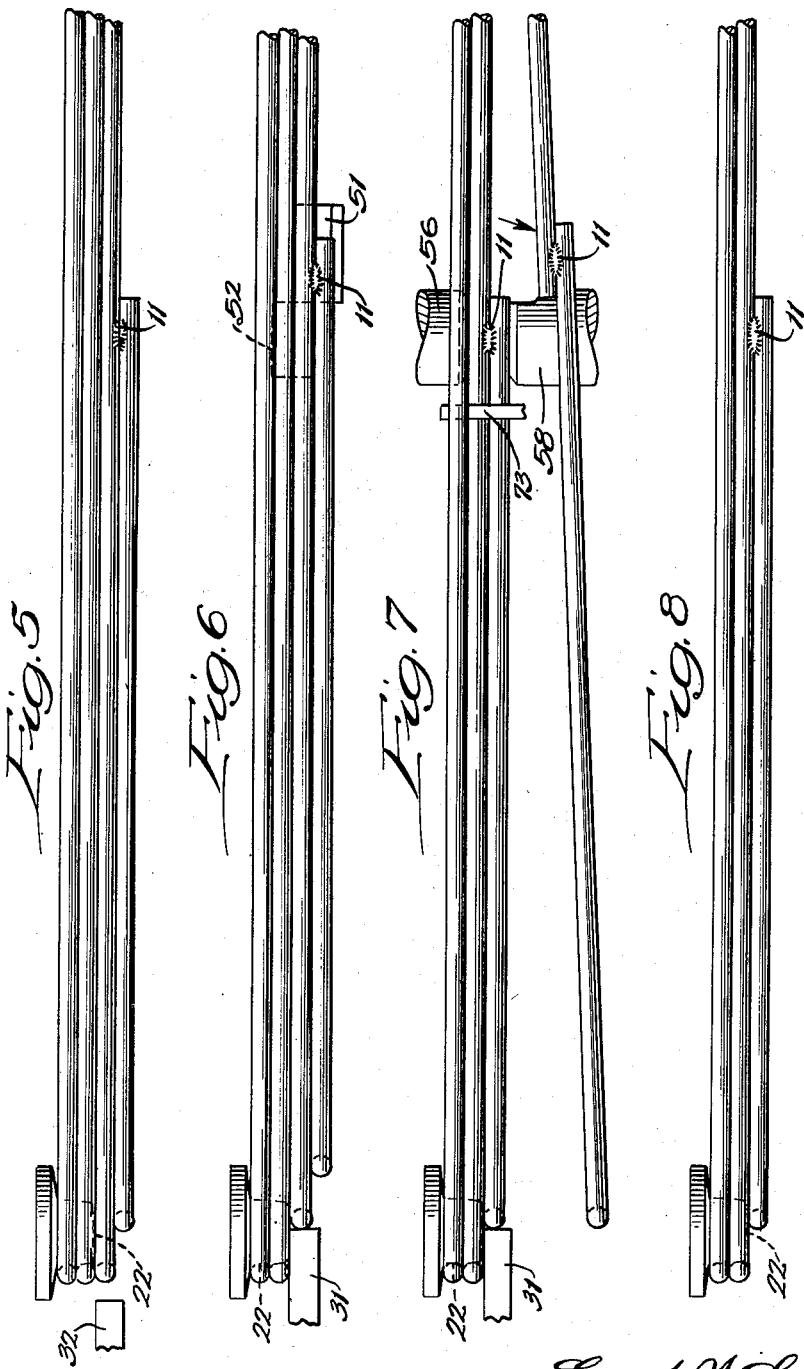

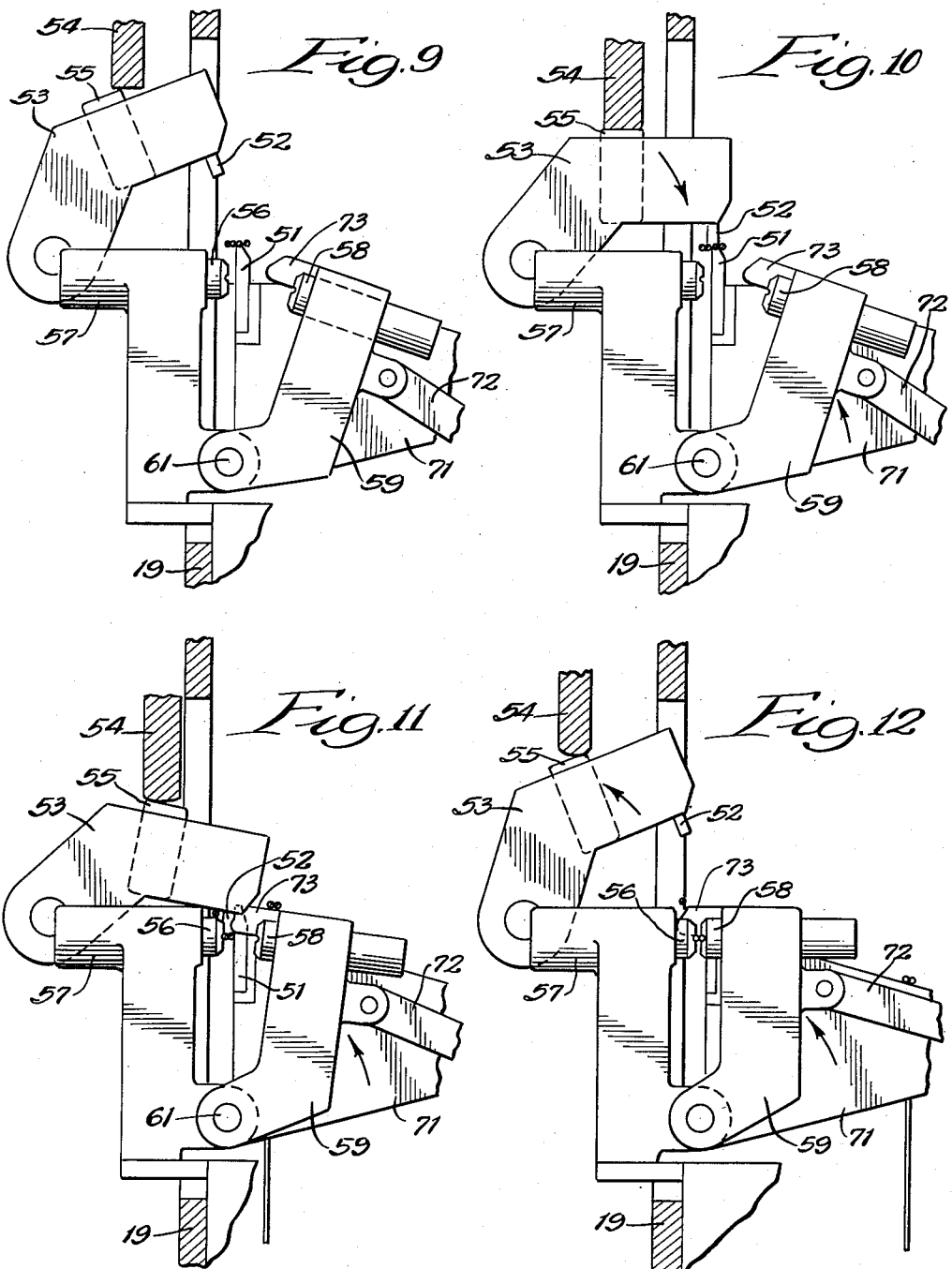

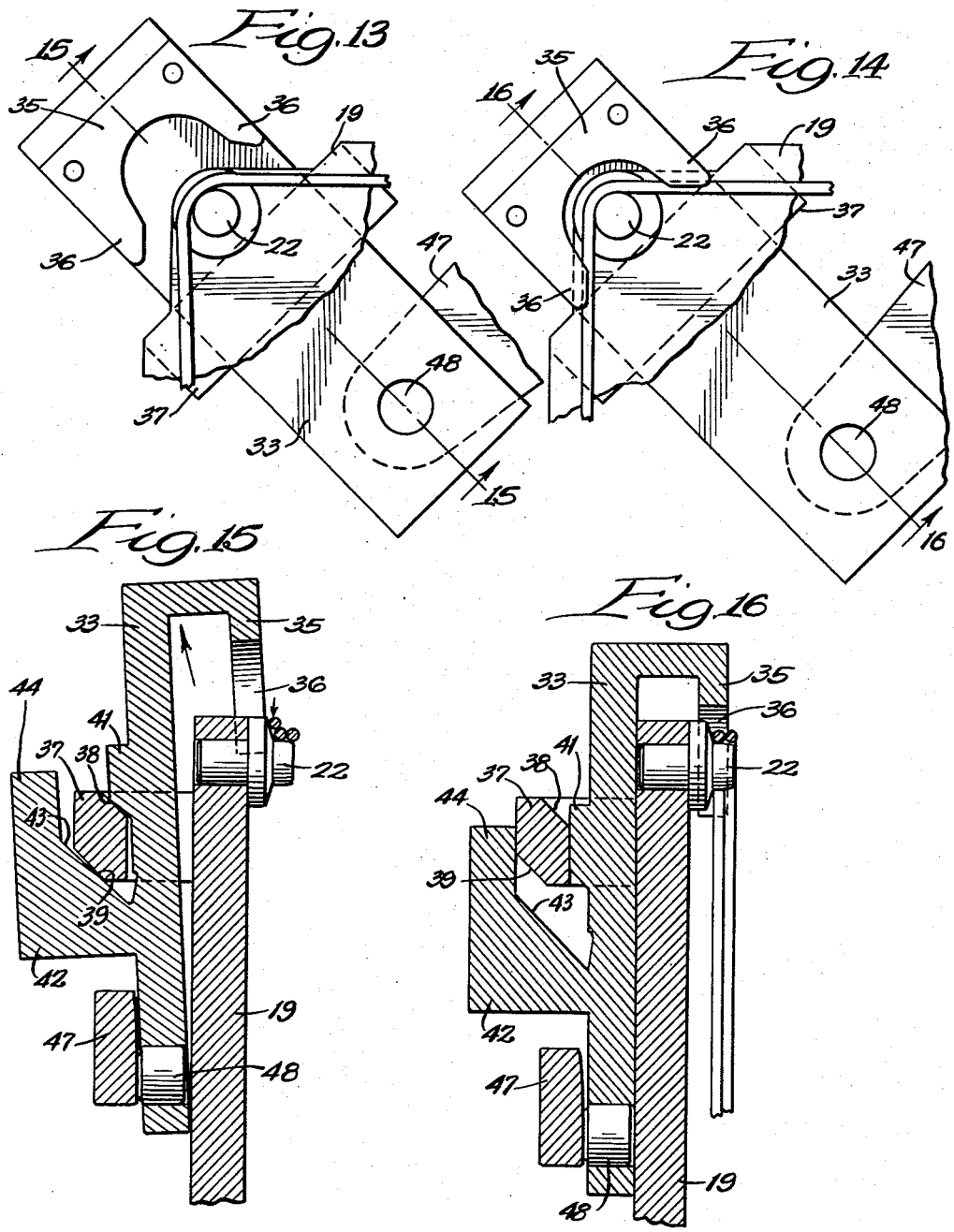

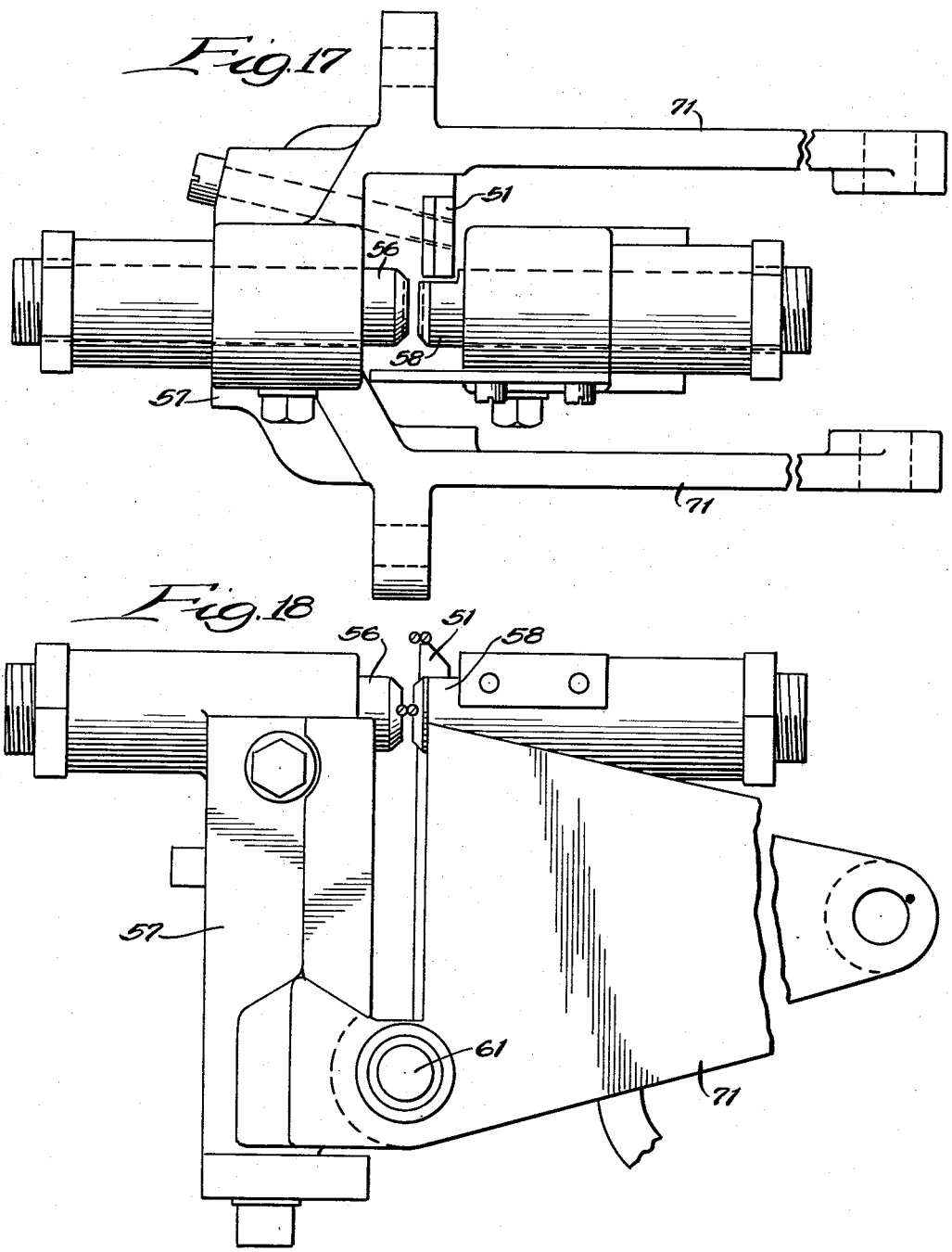

Patented July 13, 1954

2,683,474

UNITED STATES PATENT OFFICE 2,683,474

METHOD OF AND APPARATUS FOR FORMING POLYGONAL BRACKETS

Earl W. Langenberg, Peoria, Ill., assignor to Keystone Steel & Wire Company, Peoria, Ill., a corporation of Illinois Application February 25, 1950, Serial No. 146,215

14 Claims. (Cl. 140—88)

This invention relates to method of and apparatus for forming polygonal brackets and more particularly to the forming of closed welded brackets from a continuous length of wire.

For a great many different types of uses it is desirable to provide polygonal brackets of wire and to form such brackets rapidly and economically. As one example, rectangular brackets of this type are employed in flood control work for the formation of mats, the brackets being made of steel wire of approximately $\frac{3}{16}$" diameter and being about 18" by 24". Many similar units of different sizes or shapes are employed for different purposes, and the present invention provides a method and apparatus for forming brackets of substantially any desired size or shape.

It is one of the objects of the invention to provide a method and apparatus in which polygonal brackets are continuously formed from an indefinite length of wire and are successively cut off from the wire. According to one feature of the invention, the brackets are welded into closed polygonal loops before being cut from the wire.

Another object is to provide a method and apparatus in which the loops are lap welded and are initially coiled into a shape having one side slightly longer than the desired finished shape to provide stock for lapping. In the preferred arrangement the wire is wound on spaced pins or projections, one of which lies beyond the outline of the desired finished shape and which is shorter than the other pins to release the wire so that it can be pushed in to the desired shape by a cam.

Still another object is to provide a method and apparatus in which completed brackets are cut from a coil of wire, and the newly cut end is held against and welded to the next adjacent turn of the coil to form a new bracket. The cutter knife preferably pushes the cut end and the adjacent turn away from the remainder of the coil to a welding position at which they are welded together.

A further object is to provide a method and apparatus in which welding electrodes engage the wire to weld it and are held yieldingly against the wire during the welding operation. In one desirable construction the welding electrodes are moved into engagement with the wire by a cam which is urged toward the electrodes by a fluid motor to maintain a yielding force on the electrodes during welding.

A still further object is to provide a method and apparatus in which the wire is wound around projections or pins and is pressed against the projections by formers to produce relatively sharp bends. According to one important feature of the invention the formers move out of the plane of the projections when remote therefrom to avoid interference with the wire during winding.

A specific object of the invention is to provide a machine for automatically forming polygonal brackets in a continuous operation.

The above and other objects and advantages of the invention will be more readily apparent when read in connection with the accompanying drawings, in which—

Figure 2 is a side elevation;

Figure 3 is an elevational view of a completed loop;

Figure 4 is an edge view of the loop;

Figures 5, 6, 7 and 8 are partial diagrammatic views illustrating the coils of the wire at different stages in the operation;

Figures 9, 10, 11 and 12 are partial side elevations illustrating progressive steps in the cutting and welding operations;

Figures 13 and 14 are partial elevations showing different positions of the formers;

Figure 1:
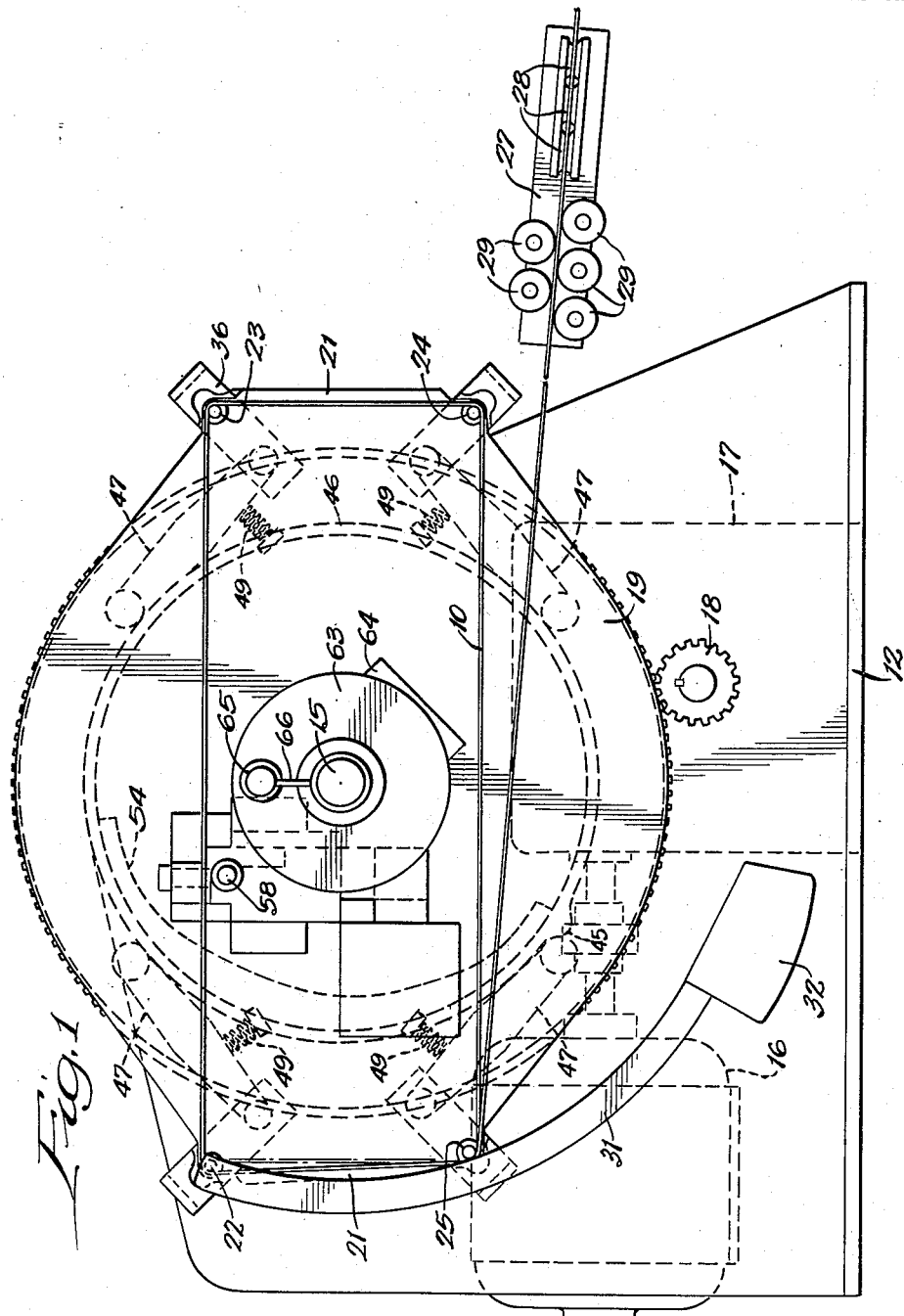
Figure 1 is a front elevation of a machine embodying the invention.

Figures 15 and 16 are sections on the lines 15—15 of Figure 13 and 16—16 of Figure 14, respectively;

Figure 17 is a top plan view of the welding electrode construction and mounting; and Figure 18 is a side elevation.

The invention, as illustrated, is particularly intended for the formation of rectangular brackets of the type shown in Figures 3 and 4. Such brackets comprise a length of wire 10 formed into a rectangle with relatively sharp bends at its corners and with the ends of the wire overlapping and welded together as shown at 11 at one side of the rectangle. The illustrated machine for forming these brackets comprises essentially a frame, a rotating head, coil winding and shaping means, formers for shaping the coil around the winding projections, cut off means and welding means. These several elements are described in detail hereinafter.

The frame

The frame, as shown, comprises a base 12 to be supported on a floor and having an upright front plate 13. The plate may be connected to the base and braced by webs 14 and carries a horizontal stub shaft 15. The shaft 15 is preferably hollow so that electrical connections, fluid pressure connections and conduits for circulating cooling liquid to the welding electrodes may be conducted therethrough.

The base carries a main driving motor 16 which is connected through a gear reducer 17 to drive a main driving pinion 18 projecting in front of the upright base plate 13. The base also carries various cams and the like to be described more fully hereinafter.

The rotating head

The base supports a rotating head having a flat front plate 19 which, as best seen in Figure 1, may have projections 21 at its ends to support forming pins 22, 23, 24 and 25 which are spaced a distance equal to the lengths of the sides in the rectangular bracket. The head carries a driving gear 26 meshing with the pinion 18 to turn the head about the fixed stub shaft 15. The head also carries on its back surface supporting brackets for the cutting, welding and forming mechanism to be described hereinafter.

The coil winding and shaping means

The pins 22 to 25 serve as winding projections upon which wire is wound into a coil to form the rectangular brackets. The wire is supplied from a suitable supply coil or reel through a straightening and tensioning device indicated at 27 which includes a series of rolls 28 lying in a horizontal plane to engage the wire on opposite sides and a second series of rolls 29 lying in a vertical plane to engage the wire on opposite sides. This construction removes any kinks from the wire so that the wire is fed into the machine in a straight condition and furthermore provides a desired degree of tension on the wire so that it will be wound tightly about the pins.

The pins 23, 24 and 25 lie within the outline of the desired finished rectangular shape, but the pin 22 lies slightly beyond this outline to provide additional stock for lap welding. As shown in Figure 1, and as indicated in dotted lines in Figure 3, the pin 22 lies parallel to but slightly beyond the adjacent long side of the rectangle so that when the wire is initially wound about the pins, the portion thereof which loops over the pin 22 will lie outside of the desired finished shape. Additionally, the pin 22 is made slightly shorter than the other pins so that it will hold only two turns of wires; whereas, the other pins 23, 24 and 25 are made of sufficient length to hold three turns of wire.

The frame carries an elongated cam 31 lying adjacent to the periphery of the rotating head and spaced outward from the head a sufficient distance to engage the corner of a turn of the wire which has just been released from the pin 22. The cam 31 includes an initial portion 32 lying radially outward slightly beyond the pin 22 to pick up the corner of a turn of the wire which has been released from the pin 22. The cam surface progressively moves radially inward until it reaches a radial distance equal to the radial spacing of the pins 23, 24 and 25 so that it will move the released turn of wire inward toward the pin 23 until the corner portion thereof lies on the desired finished rectangular outline. At this time the wire is in a position for cutting and welding to form a completed loop.

The formers

In order to form the wire sharply around the pins so that the completed bracket will have relatively sharp square corners, formers are provided to engage the wire while it is drawn over the pins and to bend it sharply around the pins. These formers are best shown in Figures 1 and 13 to 16 as comprising plates or strips 33 mounted on the back of the head plate 19 for radial sliding and swinging movement toward and away from the plane of the head plate. Each of the plates 33 has a reversely bent head portion 35 terminating in inwardly extending spaced fingers 36 spaced apart far enough to straddle opposite sides of one of the forming pins. It will be understood that there is a similar former for each of the pins 22 to 25 and that all of the formers function in the same manner.

The formers normally occupy a retracted or inoperative position as shown in Figures 13 and 15 in which they are urged radially away from the head plate. At this time it is desirable to swing the formers back relative to the plane of the head plate so that they will not interfere with winding of the wire on the forming pins. For this purpose the head plate carries a U-shaped strap 37 spanning and guiding each of the formers and having on its radial inner and outer edges angular cam surfaces 38 and 39. The plate 33 carries a cam projection 41 having a surface complementary to the cam surface 38 and further has an angular projection 42 formed with an angular cam surface 43 complementary to the surface 39 and with an extending finger 44 overlying the bracket 37. When the formers are in their radially outer position as illustrated in Figures 13 and 15, the cam surfaces on the bracket 37 and the extension 42 engage each other to swing the former back out of the plane of the forming pins so that it is out of the way of the wire being fed into the pins. When the formers are moved inward to their forming or crimping position, as shown in Figures 14 and 16, the cam surface 38 will cooperate with the cam surface on the projection 41 to shift the former forward so that its fingers 36 will lie in the plane of the pins. As the formers move inward the fingers 36 will engage the wire at opposite sides of the adjacent forming pin to bend it sharply around the pin so that a sharp angular bend is provided.

The formers are normally urged outward and are adapted to be moved inward in timed relation to the rotation of the head by a stationary cam projection 45 carried by the frame. As shown, the frame is formed with an annular cam track 46 projecting forward from the frame plate 13 and having a single cam projection 45 at one point in its periphery.

Each of the former plates 33 is pivotally connected at one end to a lever 47 which is pivoted intermediate its ends to the head plate 19 on the back surface thereof. As shown in Figures 15 and 16, each lever 47 carries at its outer end a pin 48 fitting loosely into an opening in the adjacent former so that the formers can tilt. The pins 48 together with the brackets 37 guide the formers for radial movement. The levers are engaged by springs 49 urging them in a direction to move the formers outward so that the formers normally occupy an inoperative or radially outward position until the corresponding levers engage the cam projection 45 to move them inward.

As the head rotates, the outer ends of the levers 47 or cam follower rollers carried thereby will successively ride up on the cam projection 45 at a time when the wire is stretched over the corresponding forming pin. At this time the formers will be moved inward so that their fingers 36 will engage the wire and crimp it tightly around the forming pins to produce relatively sharp angular bends. It will be noted that the wire is maintained under tension during this operation so that sharp bends around the forming pins are produced successively on each of the pins as the head turns. The position at which this occurs corresponds approximately to the position of the pin 25, as shown in Figure 1.

The cut off means

In order to cut off a formed bracket from the wire coil, a cut off mechanism is provided, as best shown in Figures 1 and 9 to 12. This mechanism comprises a stationary knife 51 mounted on the front of the head plate 19 in a position to engage the wire approximately midway between the pins 22 and 23. It is important that the short offset pin 22 trail the cut off and welding means relative to the direction of the rotation of the head as will appear more fully hereinafter. As best seen in Figures 9 to 12, the knife 51 is scarfed at its upper end to present a relatively narrow cutting surface and is positioned to engage the third turn of the coil counting outward from the head plate.

The stationary knife 51 cooperates with a movable knife 52 carried by an arm 53 pivotally mounted on the back of the head plate and extending through an opening in the plate. The arm 53 is normally urged upward to the position shown in Figure 9 by a spring or by a fluid motor and is adapted to be moved down by an elongated cam 54 fixedly mounted on the frame plate 13. The arm 53 carries a roller 55 to engage the cam 54, and as seen in Figure 1, this roller will initially engage the cam when the arm lies in approximately the seven o'clock position. As the head continues to turn, the arm 53 will be swung down to its cutting position shown in Figure 10 and will cut the third turn of the wire at approximately the nine o'clock position. Upon further turning of the head, the arm 53 will be swung further downward, as shown in Figure 11, to carry the newly cut end of the wire and the next adjacent turn radially inward from the normal position of the coil to a welding position. It will be noted in this connection that the movable knife 52 is wide enough to engage two turns of the wire so that they will simultaneously be moved. This action will occur at approximately the ten o'clock position as seen in Figure 1, and upon further rotation of the head, the arm 53 will be released by the cam to swing back to its initial inoperative position. It will be noted that the pivot for the arm 53 is mounted an appreciable distance back of the head plate so that when the arm swings outward it will also swing backward away from the plane of the forming pins so that it will not interfere with winding of the wire on the pins.

The welding means

After the wire is cut by the cut off means as described above, the newly cut end is welded to the next adjacent turn of the coil to form a complete bracket. This operation occurs when the end of the wire and the turn next adjacent thereto are pressed away from the remainder of the coil to the position shown in Figure 11.

For this purpose a pair of welding electrodes are provided, one of which, as shown at 56, is carried by a holder 57 rigidly secured to the rotating head plate with the electrode extending through a central opening in the head plate. The second electrode 58 is carried by a swinging arm 59 pivoted to the holder 57 at 61 so that the electrode 58 can swing toward and away from the electrode 56 to grip the wire between them. Preferably the electrodes are formed with grooves in their faces to receive the wires to hold them securely in position against slippage.

The electrode supporting arm 59 is moved by a face cam 62, as best seen in Figure 2. As shown, a supporting plate 63 is rigidly mounted on the stub shaft 15, and the cam 62 is pivoted to the plate 63 on a hinge 64. The hinge is opposite the low portion of the cam and the edge of the cam plate opposite the high portion of the cam is yieldingly urged toward the electrodes to maintain yielding pressure thereon during welding. As shown, the plate 63 carries a cylinder 65 to which air under pressure is admitted through a pipe 66 extending through the hollow shaft 15. A piston 67 in the cylinder is connected to the cam plate 62 to urge it toward the electrodes with a yielding substantially constant force.

The cam 62 is engaged by a roller 68 carried by one end of a bell crank lever 69 which is pivoted intermediate its ends on brackets 71 extending outward from the head plate. A link 72 connects the other end of the bell crank lever to the pivoted arm 59 so that when the bell crank is swung clockwise it will move the arm counter-clockwise to move the electrode 58 toward the electrode 56. This action occurs when the roller 68 rides up on the high part of the cam 62 in approximately the eleven o'clock position of the welding electrodes and cutter, as seen in Figure 1.

The lever 59 carries a finger 73 which is insulated from the lever and which moves in above the two wires lying between the electrodes, as seen in Figures 11 and 12 to hold the wires in place. The cams 62 and 54 are so constructed relative to each other that the cutting knife 52 will be held down until after the finger 73 has moved in over the wires and will then be released to return to its upper position, as seen in Figure 12. At this time the wires will be held by the finger 73 and the gripping action of the electrodes so that they will be properly welded together. Welding current is supplied to the electrodes by a transformer 74 under the control of a switch, not shown, which may be closed by movement of the arm 59 so that welding current will be supplied to the electrodes after they have engaged the wire. During the welding operation the fluid motor 65 maintains welding pressure on the electrodes so that the cut end of the wire will be properly and securely welded to the next adjacent turn.

Operation

In operation a wire is wound about the pins 22 to 25 as the head turns into a generally rectangular coil, one corner of which lying against the pin 22 extends beyond the desired rectangular outline. The outer end of the wire is welded to the next adjacent turn at a point corresponding to the position of the welding electrodes, and at this time with the wire fully loaded on the pins its condition looking toward the pins 22 and 23 from the outside of the loop appears as in Figure 5. It will be noted that the outermost run of wire terminating in the welded end is pushed inward relative to the remaining turns and relative to the position of the pin 22 so that a complete accurately rectangular loop is formed by the outer turn of the coil. As the new wire is picked up by the pins it lies against the pins closely adjacent to the rotary head plate 19 and will push the third turn from the pin 22, as shown in Figure 5. The wires on pin 22 are approximately in this condition when the former moves inward to crimp them about the pin 22, and the other pins will each hold three turns of wire at their respective crimping position. It will be noted that all turns on the pins except the innermost turn have previously been crimped or formed about the pins so that the former actually operates only on the innermost turn to form it. The wire will be in the condition shown in Figure 5 when the cutting and welding means are approximately in the nine o'clock position.

As the head continues to turn, the third loop or turn of the wire which has just been released from the pin 22 will engage the cam 32 and will move on to the cam 31 so that its corner portion will be shifted inward into a true rectangular relationship with the remaining corners of the loop, as shown in Figure 6. It will be observed that at this time the outermost completed loop and the third turn of the wire are shifted to the right, as seen in Figure 6, an amount equal to the overlap at the ends of a completed bracket.

The wires remain in this condition to the cutting position at which the movable knife, as indicated in dotted lines in Figure 6, moves down and cuts the third turn of the wire just to the left of the previously completed weld. This cuts off the outermost complete rectangular bracket which can then be removed from the machine. As the knife 51 travels further down, it moves the newly cut off end and the next adjacent or second turn of the wire between the welding electrodes, as seen in Figure 7, where the turns of wire are held by the finger 73 and the pressure of the electrodes. At this time a new weld is completed between the newly cut end portion of the wire and the second turn, and the welding electrodes are opened as the roller 68 travels back on to the low part of the cam 62 to release the wire. At this time with the welding electrodes in substantially the six o'clock position, as seen in Figure 1, the wire is in the condition shown in Figure 8 with the pin 22 ready to receive the next turn of wire.

It will be seen that with the machine, as shown, a bracket is completed on each revolution of the head and that the operation is continuous and automatic. Even with relatively large brackets of relatively heavy wire, it has been found that at least twenty brackets per minute can be formed accurately and automatically on a machine of this type.

While the present invention has been particularly described in connection with rectangular brackets, it will be apparent that brackets of any other desired shape might equally well be formed and that various changes in the machine and method might be made without departing from the invention. It will, therefore, be understood that the particular embodiment of the invention illustrated and described is not to be taken as a definition of the scope of the invention, reference being had for this purpose to the appended claims.

What is claimed is:

1. The method of continuously forming polygonal brackets of wire which comprises continuously bending an indefinite length of wire into a figure having straight sides joined by sharp bends and all sides but one in which the end of the wire falls of the desired finished length with said one side longer than the desired finished length and with the end of the wire adjacent to a succeeding turn, shifting the end of the wire inward an amount equal to the desired overlap in a finished bracket, welding the end portion of the wire to the succeeding turn, and cutting the succeeding turn adjacent to the weld to release a completed bracket.

2. The method of continuously forming polygonal brackets of wire which comprises continuously forming an indefinite length of wire into a multiple turn coil having straight sides joined by sharp bends and all sides but one of the desired finished length and said one side longer than the desired finished length, forming the outer turn of the coil to the desired finished shape and lap welding the outer two turns of wire together at said one side of the coil, forcing the second turn of the coil inward at said one side an amount equal to the desired lap, cutting off the second turn of the coil back of the weld to release the outer welded turn, and welding the free end portion of the wire to the next adjacent turn.

3. Apparatus for forming polygonal wire brackets comprising a frame, a head rotatable relative to the frame means to rotate the head, projections fixed to and extending from the head on which a wire is adapted to be wound in a coil with the end of the coil lying between adjacent projections, one of the projections immediately trailing the end of the wire being shorter than the other projections whereby the outer turn of the coil will be released therefrom while remaining on the other projections, fixed cam means mounted adjacent to the head and engageable with the wire to force the released run of the wire inward, welding means carried by the head to weld the released run of the wire to the next adjacent turn and control means operated by rotation of the head to control the operation of the welding means.

4. Apparatus for forming polygonal wire brackets comprising a frame, a head rotatable relative to the frame means to rotate the head, projections fixed to and extending from the head on which a wire is adapted to be wound in a coil with the end of the coil lying between adjacent projections, all of the projections except one lying in the outline of the desired polygonal shape and said one projection lying beyond the outline and being shorter than the other projections and immediately trailing the end of the wire, fixed cam means mounted adjacent to the head and engageable with the wire to force a turn of the wire released from said one projection inward to conform to the desired polygonal shape, welding means carried by the head to weld the turn of wire so forced in to the next adjacent turn of the wire and control means operated by rotation of the head to control the operation of the welding means.

5. Apparatus for forming polygonal wire brackets comprising a frame, a head rotatable relative to the frame means to rotate the head, projections fixed to and extending from the head on which a wire is adapted to be wound in a coil with the end of the coil lying between adjacent projections, all of the projections except one lying in the outline of the desired polygonal shape and said one projection lying beyond the outline and being shorter than the other projections and immediately trailing the end of the wire, fixed cam means mounted adjacent to the head and engageable with the wire to force a turn of the wire released from said one projection inward to conform to the desired polygonal shape, cutting means including relatively movable knives carried by the head on the head to cut off the turn of wire so forced in, means operated by rotation of the head to move the knives relatively together to cut off the wire, welding means including electrodes carried by the head for movement relatively together and apart to weld the newly cut end of the wire to the next adjacent turn and means operated by rotation of the head to control movement of the electrodes to effect a welding operation.

6. Apparatus for forming polygonal wire brackets comprising a frame, a head rotatable relative to the frame means to rotate the head, projections fixed to and extending from the head on which a wire is adapted to be wound in a coil with the end of the coil lying between adjacent projections, all of the projections except one lying in the outline of the desired polygonal shape and said one projection lying beyond the outline and being shorter than the other projections and immediately trailing the end of the wire, fixed cam means mounted adjacent to the head and engageable with the wire to force a turn of the wire released from said one projection inward to conform to the desired polygonal shape, a cutting knife fixed on the head, a cutting knife on the head movable toward the coil and cooperating with the fixed knife to cut off the turn of wire so forced in and to force the newly cut end and the next adjacent turn away from the remainder of the coil, means operated by rotation of the head to move the movable knife, welding electrodes carried by the head for movement into engagement with the newly cut end and the next adjacent turn to weld them together and means operated by rotation of the head to control movement of the electrodes to effect a welding operation.

7. Apparatus for forming polygonal wire brackets comprising a frame, a horizontal fixed shaft on the frame, a head plate rotatable around the shaft, means to rotate the head plate spaced pins on the outer face of the head plate on which a wire is adapted to be wound in a coil, all of the pins but one lying in the outline of a desired polygonal bracket shape and said one pin lying beyond the desired shape and being shorter than the others to release a turn of the wire which is retained on the other pins, a cam carried by the frame to engage the released turn of wire adjacent said one of the pins and push it inward to the desired shape, welding means carried by the head to weld the released turn of wire to the next adjacent turn, and a cam carried by the frame to operate the welding means after the released turn has been pushed inward.

8. Apparatus for forming polygonal wire brackets comprising a frame, a horizontal fixed shaft on the frame, a head plate rotatable around the shaft, means to rotate the head plate spaced pins on the outer face of the head plate on which a wire is adapted to be wound in a coil, all of the pins but one lying in the outline of a desired polygonal bracket shape and said one pin lying beyond the desired shape and being shorter than the others to release a turn of the wire which is retained on the other pins, a cam carried by the frame to engage the released turn of wire adjacent said one of the pins and push it in to the desired shape a fixed cut off knife on the head, a cut off knife pivoted on the head and cooperating with the fixed knife to cut off the turn of wire so pushed in, a cam on the frame engaging the cut off knife to pivot it, the knife carrying the newly cut end and the next adjacent turn radially inward of the normal wire position, welding electrodes carried by the head and engageable with the cut end and the adjacent turn at said inward position, and a cam carried by the shaft to move the electrodes to welding position.

9. Apparatus for forming polygonal wire brackets comprising a frame, a horizontal fixed shaft on the frame, a head plate rotatable around the shaft, means to rotate the head plate spaced pins on the outer face of the head plate on which a wire is adapted to be wound in a coil, all of the pins but one lying in the outline of a desired polygonal bracket shape and said one pin lying beyond the desired shape and being shorter than the others to release a turn of the wire which is retained on the other pins, formers movably mounted on the head plate adjacent the pins and movable radially inward toward the pins to engage the wire and form it tightly around the pins, cam means operated by rotation of the head plate to move the formers toward the pins, a cam carried by the frame to engage the bent corner of the wire released from said one of the pins and push it in to the desired finished position a fixed cut off knife on the head, a cut off knife pivoted on the head plate and cooperating with the fixed knife to cut off the turn of wire so pushed in, a cam on the frame engaging the cut off knife to move it about its pivot, the knife carrying the newly cut end and the next adjacent turn radially inward from their normal positions, welding electrodes engageable with the cut end and the adjacent turn at said inward position to weld them, and a cam carried by the shaft to move the electrodes into engagement with the wire.

10. Apparatus for forming polygonal wire brackets comprising a frame, a head rotatable relative to the frame, means to rotate the head, projections fixed to and extending from the head on which a wire is adapted to be wound in a coil with the end of the coil lying between adjacent projections, the projection immediately trailing the end of the coil in the direction of rotation of the head being so constructed and arranged as to release the outer turn of the coil while it is retained on the other projections, means relative to which the head is rotatable and engageable with the turn of wire adjacent to the end of the coil to move it lengthwise toward the end of the coil, means to move the end of the coil and the adjacent turn away from the remainder of the coil, welding electrodes carried by the head and movable relatively together into engagement with the end of the coil and the adjacent turn to weld them together, cutting means including relatively movable parts mounted on the head to cut off the adjacent turn just back of the weld and cam control means operated by rotation of the head to control operation of the moving means, the welding electrodes and the cutting means.

11. Apparatus for forming polygonal wire brackets comprising a frame, a head rotatable relative to the frame, means to rotate the head, projections fixed to and extending from the head on which a wire is adapted to be wound in a coil with the end of the coil lying between adjacent projections, the projection immediately trailing the end of the coil in the direction of rotation of the head being so constructed and arranged as to release the outer turn of the coil while it is retained on the other projections, means relative to which the head is rotatable and engageable with the turn of wire adjacent to the end of the coil to move it lengthwise toward the end of the coil, means operated by rotation of the head to move the end of the coil and the adjacent turn away from the remainder of the coil, a pair of welding electrodes one movable on the head and the other fixed on the head and engageable with the end of the coil and the adjacent turn to weld them together, a cam relative to which the head is rotatable and acting on said one of the electrodes to move it toward the other to engage the wire, means for maintaining yielding pressure on the electrode during welding, cutting means including relatively movable parts mounted on the head to cut off the adjacent turn just back of the weld and cam means operated by rotation of the head to control operation of the cutting means.

12. Apparatus for forming polygonal wire brackets comprising a frame, a head rotatable relative to the frame, means to rotate the head, projections fixed to and extending from the head on which a wire is adapted to be wound in a coil with the end of the coil lying between adjacent projections, the projection immediately trailing the end of the coil in the direction of rotation of the head being so constructed and arranged as to release the outer turn of the coil while it is retained on the other projections, means relative to which the head is rotatable and engageable with the turn of wire adjacent to the end of the coil to move it lengthwise toward the end of the coil, means operated by rotation of the head to move the end of the coil and the adjacent turn away from the remainder of the coil, a pair of welding electrodes one movable on the head and the other fixed on the head and engageable with the end of the coil and the adjacent turn to weld them together, a movably mounted cam for moving one of the electrodes toward the other, a fluid operated motor urging the cam toward the electrodes to maintain pressure on the electrodes during welding, cutting means including relatively movable parts mounted on the head to cut off the adjacent turn just back of the weld and cam means operated by rotation of the head to control operation of the cutting means.

13. Apparatus for forming polygonal wire brackets comprising a frame, a head rotatable relative to the frame, means to rotate the head, projections fixed to and extending from the head on which a wire is adapted to be wound in a coil with the end of the coil lying between adjacent projections, the projection immediately following the end of the coil being shorter than the others to release the second turn adjacent to the end of the coil before it is released by the others, means relative to which the head is rotatable to advance the second turn lengthwise toward the end of the coil, a fixed cutting knife on the head, a cutting knife on the head movable toward the coil and cooperating with the fixed knife to cut the second turn adjacent to the end of the coil and to force the newly cut end and the next adjacent turn away from the remainder of the coil, welding electrodes mounted on the head and movable into engagement with the newly cut end and the next adjacent turn to weld them together and cam control means operated by rotation of the head to control movement of the movable cutting knife and the electrodes.

14. Apparatus for forming polygonal wire brackets comprising a frame, a head rotatable relative to the frame, means to rotate the head, projections fixed to and extending from the head on which a wire is adapted to be wound in a coil with the end of the coil lying between adjacent projections, the projection immediately following the end of the coil being shorter than the others to release the second turn adjacent to the end of the coil before it is released by the others, means relative to which the head is rotatable to advance the second turn lengthwise toward the end of the coil, a fixed cutting knife on the head, a cutting knife on the head movable toward the coil and cooperating with the fixed knife to cut the second turn adjacent to the end of the coil and to force the newly cut end and the next adjacent turn away from the remainder of the coil, a pair of welding electrodes mounted on the head to engage the cut end and next adjacent turn in their moved position, means mounting one of the electrodes for movement toward and away from the other, said other electrode being fixed on the head, a finger carried by said one electrode to engage the wire and hold it in the moved position, and cam means operated by rotation of the head to move the cutting knife and to move said one of the electrodes in timed relation with the cutting knife.

References Cited in the file of this patent

UNITED STATES PATENTS

| Number | Name | Date |
|---|---|---|
| 654,225 | Carnagy | July 24, 1900 |
| 705,130 | Perry | July 22, 1902 |
| 937,328 | Pomeroy | Oct. 19, 1909 |
| 937,134 | Wouters | Oct. 19, 1909 |
| 1,429,814 | Weiss | Sept. 19, 1922 |
| 1,457,691 | Bull | June 5, 1923 |
| 1,637,121 | Lovejoy | July 26, 1927 |
| 1,715,046 | Rogan | May 28, 1929 |
| 1,756,427 | Gunter | Apr. 29, 1930 |
| 1,896,670 | Garst | Feb. 7, 1933 |
| 1,964,445 | Wikle | June 26, 1934 |
| 1,987,334 | Geer | Jan. 8, 1935 |
| 2,049,587 | Lehman | Aug. 4, 1936 |
| 2,117,262 | Trussell | May 10, 1938 |
| 2,225,187 | Stitt | Dec. 17, 1940 |
| 2,422,827 | Drieschman | June 24, 1947 |
| 2,441,228 | Schneider | May 11, 1948 |
| 2,451,169 | May | Oct. 12, 1948 |
| 2,455,549 | Benjamin | Dec. 7, 1948 |